United States Patent
Melnikov et al.

(10) Patent No.: US 10,885,252 B1
(45) Date of Patent: Jan. 5, 2021

(54) COVERAGE MODEL ENHANCEMENT TO SUPPORT LOGIC AND ARITHMETIC EXPRESSIONS

(71) Applicant: Cadence Design Systems, Inc., San Jose, CA (US)

(72) Inventors: Rodion Vladimirovich Melnikov, Modiin (IL); Amit Metodi, Petah-Tikva (IL); Samer Raed Alqassis, Bethlehem (IL)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/830,248

(22) Filed: Mar. 25, 2020

Related U.S. Application Data

(60) Provisional application No. 62/983,217, filed on Feb. 28, 2020.

(51) Int. Cl.
  *G06F 30/3323* (2020.01)
  *G06F 30/31* (2020.01)
  *G06F 111/04* (2020.01)
  *G06F 119/12* (2020.01)

(52) U.S. Cl.
  CPC .......... *G06F 30/3323* (2020.01); *G06F 30/31* (2020.01); *G06F 2111/04* (2020.01); *G06F 2119/12* (2020.01)

(58) Field of Classification Search
  CPC .. G06F 30/3323; G06F 30/31; G06F 2111/04; G06F 2119/12
  USPC ........................................................ 716/106
  See application file for complete search history.

(56) References Cited

U.S. PATENT DOCUMENTS

| | | | | |
|---|---|---|---|---|
| 9,348,733 | B1* | 5/2016 | Leibovich | G06F 11/3676 |
| 9,582,620 | B1* | 2/2017 | Segal | G06F 11/3676 |
| 9,665,350 | B1* | 5/2017 | Kalmar | G06F 11/3676 |
| 9,891,281 | B1* | 2/2018 | Kinderman | G06F 30/398 |
| 10,330,728 | B2* | 6/2019 | Bose | G01R 31/318335 |
| 10,394,699 | B1* | 8/2019 | Kinderman | G06F 11/3676 |
| 2007/0226663 | A1* | 9/2007 | Bormann | G06F 30/3323 716/106 |
| 2012/0324414 | A1* | 12/2012 | Tzoref-Brill | G01R 31/318371 716/136 |
| 2015/0067627 | A1* | 3/2015 | Gaurav | G06F 30/33 716/112 |

(Continued)

*Primary Examiner* — Suresh Memula
(74) *Attorney, Agent, or Firm* — Schwegman Lundberg & Woessner, P.A.

(57) ABSTRACT

Aspects of the present disclosure address systems and methods for functional coverage in integrated circuit (IC) designs utilizing arbitrary expression to define irrelevant domains in coverage item definitions. A coverage item definition is determined to include an arbitrary expression that defines an irrelevant domain for a coverage item in a functional coverage analysis of an IC design. Based on determining if the item definition comprises the arbitrary expression, a verification the arbitrary expression satisfies one or more analyzability conditions is performed. Based on verifying the arbitrary expression satisfies the one or more analyzability conditions, the irrelevant domain for the coverage item is calculated based on the arbitrary expression. An enhanced functional coverage model that excludes the irrelevant domain for the coverage item is generated and used to perform the functional coverage analysis on the IC design.

20 Claims, 5 Drawing Sheets

(56) References Cited

U.S. PATENT DOCUMENTS

2016/0267209 A1\* 9/2016 Ikram .................... G06F 30/30

\* cited by examiner

COVERAGE MODEL ENHANCEMENT TO SUPPORT LOGIC AND ARITHMETIC EXPRESSIONS

CLAIM OF PRIORITY

This application claims the benefit of priority under 35 U.S.C. § 119(e) to U.S. Patent Application Ser. No. 62/983,217, filed on Feb. 28, 2020, which is incorporated by reference herein in its entirety.

TECHNICAL FIELD

The present disclosure generally relates to the technical field of integrated circuit (IC) design. In particular, the present disclosure addresses systems and methods for testing IC devices using functional coverage models that support domain definitions using arbitrary expressions.

BACKGROUND

Electronic design automation (EDA) is a category of systems for assisting with the design of electronic systems and devices. Traditional EDA systems include verification tools to facilitate functional verification of device designs, which is an important phase in the design cycle of electronic systems and devices. Functional coverage analysis is a process by which quality and progress of a functional verification of a device is measured and holes in functional test coverage are identified.

In functional coverage analysis, a coverage model is defined and used to measure progress of a functional verification of a device design. The coverage model describes multiple items that are to be covered by the functional coverage (referred to herein as "coverage items"). Coverage items may, for example, represent a register in device under test, a transaction kind, or a secret sequence of a transaction.

Generally, a coverage item within a coverage model comprises a value of a variable. Coverage items that are integer type are split into multiple coverage buckets to fine tune coverage and reduce the required analysis. For integer type coverage items, there are three basic approaches: (1) creating a bucket for each value in the type's domain; (2) automatically creating buckets of the same size from the whole domain; or (3) letting the user define subdomains for the item, each one with its own rules. Most EDA systems support verification languages that have a construct to indicate that a particular portion of the domain is not relevant for the coverage model. Many conventional verification tools allow only explicit domain syntax (e.g., "ignore: [0 . . . 8]") in item coverage definitions though some verification tools also allow arbitrary expressions that include combinations of logic and arithmetic operations (e.g., "ignore=item<0||item>50").

Typically, explicit domain expressions can be handled when splitting the coverage item into coverage buckets by simply excluding the irrelevant domain from the item domain when coverage bucketing. That is, a coverage engine of a verification tool can decide on the number of coverage buckets and a gradability of the coverage item based on an analysis of the irrelevant domain that has been explicitly defined.

Coverage items that include arbitrary expressions, on the other hand, are assumed within the coverage model to be black boxes. This leads to inadequacies in the coverage model that are not easily detectable and might require a complicated search for a workaround. In many cases, these inadequacies of the coverage model also lead to performance issues. A reason for these inadequacies is that a coverage model contains only buckets of relevant values, and buckets that include irrelevant values only are excluded from the coverage model. For example, when a bucket is automatically created for each value of an integer, evaluating the expression as black box for each value requires extensive computational resources for a 32-bit integer, and is infeasible for 64-bit integer, so such items are declared as ungradable. When a coverage item is separated into limited number of buckets, the black box approach requires finding at least one relevant value in a bucket to identify it as relevant. For buckets of a 64-bit item, this can lead to an infeasibly exhaustive search. In these instances, different heuristics are used that, in some cases, miss relevant values, so a bucket might be incorrectly identified as irrelevant.

With current EDA systems and verification tools, if a user wants to get the advantages of an explicit domain, it is impossible to do so using a meaningful and readable expression. Instead, the user must compute the domain manually. This is complicated and makes the maintenance of the code unreasonably complex.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure address the deficiencies of prior EDA verification tools, among others, by providing a verification tool that allows arbitrary expressions to be used to define irrelevant domains for coverage items in functional coverage models. That is, the verification tool supports coverage item definitions that include expressions with one or more logic or arithmetic operators used to define irrelevant domains for coverage items.

Consistent with some embodiments, a verification tool of an EDA system accesses a coverage item definition that includes an expression that defines an irrelevant domain for the coverage item. If the expression is an explicit domain expression, the verification tool merely excludes the explicitly defined domain from the cover item's domain and performs functional coverage using a basic coverage model. If the expression is an arbitrary expression that includes one or more logic or arithmetic operators, the verification tool determines whether the expression satisfies one or more analyzability conditions. For example, the verification tool may verify that the expression does not create any side effects and returns the same result for the same item and parameter values.

If the expression fails to satisfy one or more analyzability conditions, a functional coverage analysis is performed with the expression treated as ungradable in the functional coverage model. Coverage items that are treated as ungradable may be omitted from a resulting report that summarizes the results of the functional coverage or may be included in the report without any corresponding results.

If the expression does satisfy the analyzability conditions, the verification tool performs a domain analysis on the arbitrary expression to compute the irrelevant domain for the coverage item. An enhanced coverage model is generated based on the computed irrelevant domain and used to perform functional coverage.

In this manner, functional coverage models are enhanced to more correctly reflect the actual intent of the user while avoiding heuristic errors and significantly improving verification tool performance.

Figure 1:
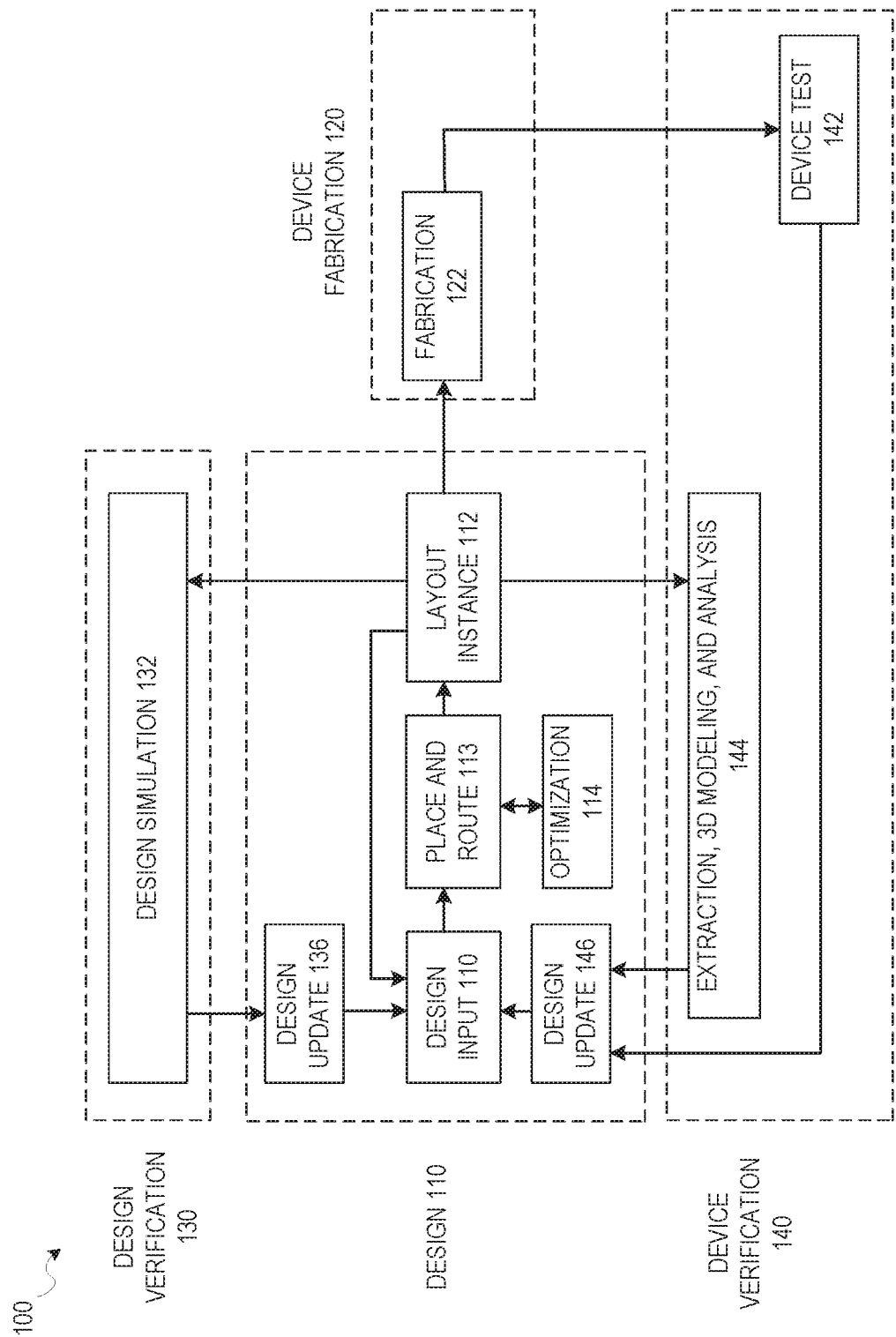
FIG. 1 is a diagram illustrating a possible design process flow that includes a method for functional coverage that supports irrelevant domain definitions for coverage items using arbitrary expressions, according to some example embodiments.

FIG. 1 is a diagram illustrating a possible design process flow 100 for IC design that includes a method for functional coverage that supports irrelevant domain definitions for coverage items using arbitrary expressions, according to some example embodiments. It will be apparent that other design flow operations may function using the timing constraints and optimizations described herein, but a design flow 100 is described here for the purposes of illustration. As illustrated, the design flow 100 includes a design input phase 110, a device fabrication phase 120, a design verification phase 130, and a device verification phase 140. The design input phase 110 involves an initial design input phase 110 where the basic elements and functionality of a device are determined, as well as revisions based on various analyses and optimization of a circuit design. This design input phase 110 operation is where block instances are used in the circuit design and any additional circuitry for the design around the blocks is selected. The initial strategy, tactics, and context for the device to be created are also generated in the design input phase 110 operation, depending on the particular design algorithm to be used.

In some embodiments, following an initial selection of design values in the design input phase 110 operation, routing, placement, and timing analysis are performed in a place and route 113 operation, and optimization is performed in an optimization phase 114 operation along with any other automated design processes. While the design process flow 100 shows place and route 113 and optimization phase 114 occurring prior to a layout instance 112, routing, placement, timing analysis, and optimization may be performed at any time to verify operation of a circuit design. For instance, in various embodiments, timing analysis in a circuit design may be performed prior to routing of connections in the circuit design, after routing, during register transfer level (RTL) operations.

While the design process flow 100 shows such optimization occurring prior to a layout instance 112, such timing analysis and optimization may be performed at any time to verify operation of a circuit design. For example, in various embodiments, constraints for blocks in a circuit design may be generated prior to routing of connections in the circuit design, after routing, during register transfer level (RTL) operations, or as part of a final signoff optimization or verification prior to a device fabrication operation 122. Certain embodiments of operations described herein for generating and refining a clock tree structure may therefore involve iterations of the design input phase 110, optimization phase 114, and layout instance 112 generation. In other systems, other design processes may be used.

After design inputs are used in the design input phase 110 to generate a circuit layout, and any optimization phases 114 (e.g., local refinement transforms) are performed, a layout is generated in the layout instance 112. The layout describes the physical layout dimensions of the device that match the design inputs. This layout may then be used in the device fabrication operation 122 to generate a device, or additional testing and design updates may be performed using designer inputs or automated updates based on design simulation 132 operations, or extraction, three-dimensional (3D) modeling, and analysis 144 operations. Once the device is generated, the device can be tested as part of device test 142 operations and layout modifications generated based on actual device performance.

Design updates 136 from the design simulation 132 operations; design updates 146 from the device test 142 or extraction, 3D modeling, and analysis 144 operations; or further direct design input phases 110 may occur after an initial layout instance 112 is generated. In various embodiments, whenever design inputs are used to update or change an aspect of a circuit design, a timing analysis and an optimization phase 114 may be performed.

Any one or more of the design verification phases 130 or device verification phase 140 may include a functional coverage analysis. As part of functional coverage, a user may define multiple coverage items. User may define domains for coverage items using domain expressions as well as arbitrary expressions that contain logic and/or arithmetic operators. Further details regarding the functional coverage analysis are discussed below.

Figure 2:
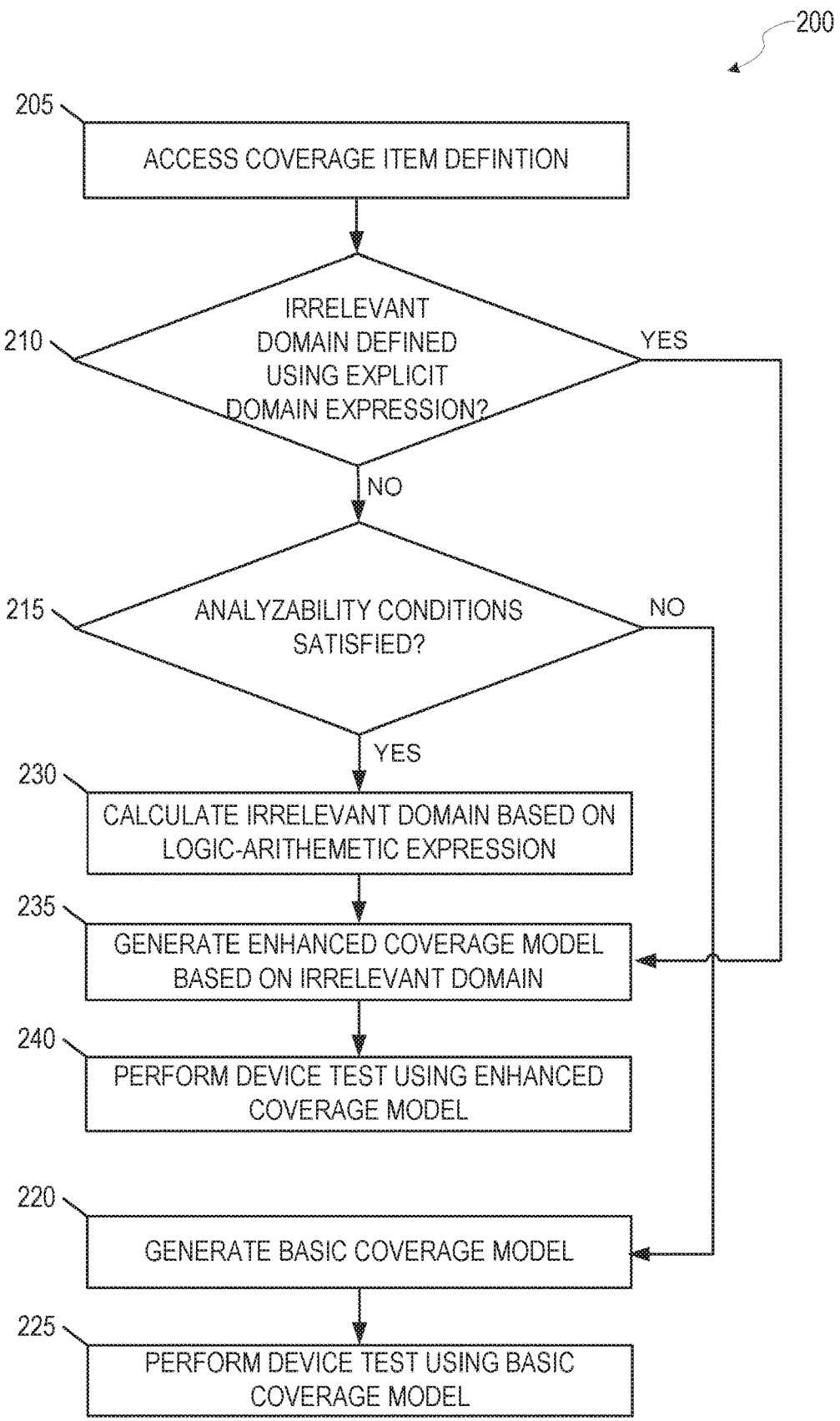
FIGS. 2-3 are flowcharts illustrating operations of a method for IC device testing that supports irrelevant domain definitions for coverage items using arbitrary expressions, according to some embodiments.
Figure 3:
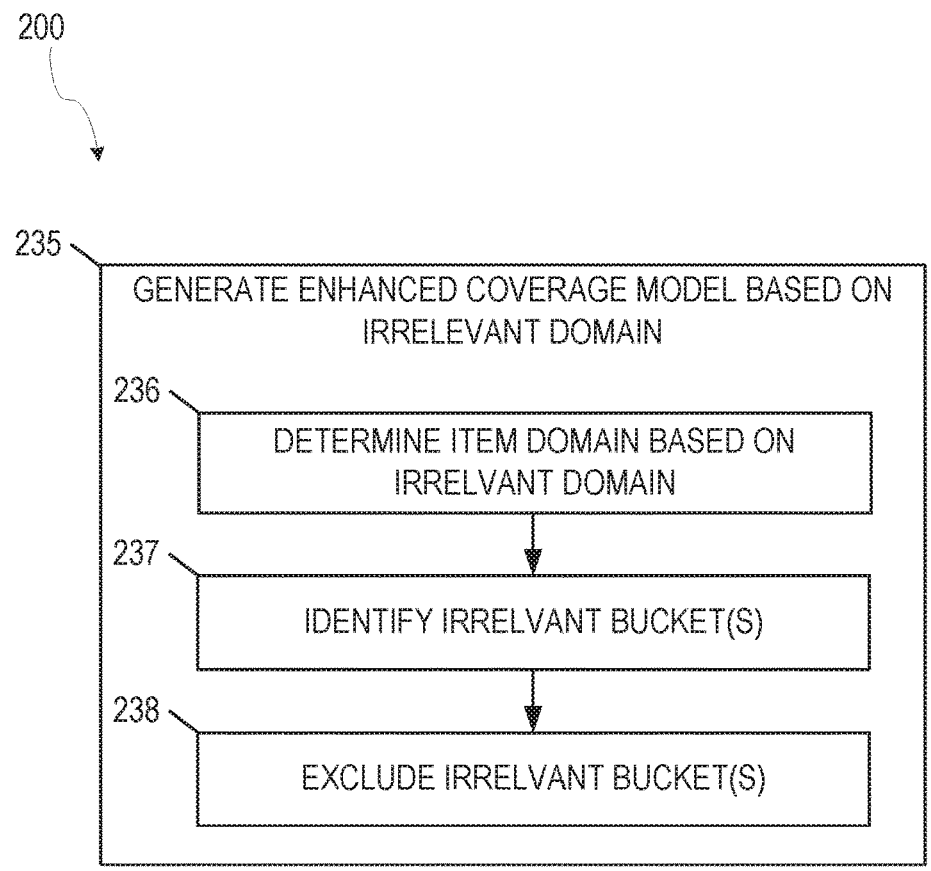

FIGS. 2-3 are flowcharts illustrating operations of a method 200 for IC device testing that supports irrelevant domain definitions for coverage items using arbitrary expressions, according to some embodiments. For some embodiments, the method 200 is performed as part of a functional coverage analysis applied to an IC device design (e.g., by an EDA software system).

It will be understood that the method 200 may be performed by a computing device, such as a computing device executing instructions of an EDA software system that includes a verification tool. For example, the operations of a method 200 may be represented by executable instructions (e.g., EDA software) that, when executed by a processor of a computing device, cause the computing device to perform the method 200. Thus, any one or more of the operations of the method 200 may be performed by a hardware processor (e.g., central processing unit or graphics processing unit) of a computing device (e.g., desktop, server, etc.). Accordingly, the method 200 is described below in reference to such a computing device.

Depending on the embodiment, an operation of the method 200 may be repeated in different ways or involve intervening operations not shown. Though the operations of the method 200 may be depicted and described in a certain order, the order in which the operations are performed may vary among embodiments, including performing certain operations in parallel.

At operation 205, the computing device accesses a coverage item definition that defines a coverage item for functional coverage of an IC device. The coverage item definition comprises an expression that defines an irrelevant domain for the coverage item. The irrelevant domain includes values that are either illegal or that can otherwise be ignored for purposes of the coverage model. The expression may be either an explicit domain expression (e.g., ignore: [0 . . . 8];) or may be an arbitrary expression that defines the irrelevant domain using logic and/or arithmetic operations (e.g., ignore=item<0||item>50).

The computing device determines, at operation 210, whether the irrelevant domain for the coverage item is defined using an explicit domain expression. If, at operation 210, the computing device determines that the irrelevant domain for the coverage item is defined using an arbitrary expression, the method proceeds to operation 215 where the computing device determines whether the arbitrary expression satisfies one or more analyzability conditions. The analyzability conditions may, for example, include that the arbitrary expression does not create any downstream side effects and that the arbitrary expression evaluates to the same result for the same item values. Accordingly, in determining whether the arbitrary expression satisfies the one or more analyzability conditions, the computing device confirms that the arbitrary expression does not create any downstream side effects and further confirms that the arbitrary expression returns an identical result for identical item values. Example downstream effects include changing a state of a verification environment, a device under test, or the computing device itself.

In verifying whether the arbitrary expression satisfies the one or more analyzability conditions, the computing device may parse the expression to generate a syntax tree to represent the expression. The computing device may then traverse the syntax tree to verify that the analyzability conditions are satisfied. In verifying that the arbitrary expression satisfies the one or more analyzability conditions, the computing device may confirm, through traversal of the syntax tree, that the expression includes only variables, constants, and logic and/or arithmetic operators.

If the computing device determines that the arbitrary expression does not satisfy one or more analyzability conditions, the method 200 proceeds to operation 220 where the computing device generates the basic coverage model and performs the functional coverage analysis using the basic coverage model, at operation 225. In generating the basic coverage model, the computing device either determines the coverage item is ungradable, in which case the coverage item is treated as ungradable in the basic coverage model, or the computing device evaluates the expression a predetermined number of times to heuristically identify irrelevant buckets. After testing the IC device using the basic model in which the coverage item is treated as ungradable, the computing device may provide a coverage report that indicates that the coverage item is ungradable.

If the computing device determines that the arbitrary expression does satisfy the analyzability constraints, the computing device calculates the irrelevant domain using the arbitrary expression (operation 230). In calculating the irrelevant domain from the arbitrary expression, the computing device parses the arbitrary expression to generate a syntax tree based on the arbitrary expression and the computing device performs a domain analysis on the syntax tree to determine the irrelevant domain. For example, the computing device may recursively traverse the syntax tree to evaluate each sub-tree to determine a domain of each sub-tree. In traversing the syntax tree, determined domains of sub-trees are returned to higher-level nodes and higher-level nodes are evaluated according to operation semantics. Consistent with some embodiments, the computing device may generate a data structure that represents the irrelevant domain.

At operation 235, the computing device generates an enhanced coverage model based on the irrelevant domain for the coverage item. The enhanced coverage model excludes the irrelevant domain for the coverage item. The computing device uses the enhanced coverage model to perform functional coverage analysis of the IC device design, at operation 240.

Returning to operation 210, if the computing device determines the irrelevant domain for the coverage item is defined using an explicit domain expression, the method 200 proceeds to operation 235, where the computing device generates the enhanced coverage model based on the explicitly defined domain expression.

As shown in FIG. 3, the method 200 may, in some embodiments, include operations 236, 237, and 238. Consistent with these embodiments, the operations 236, 237, and 238 may be performed as part of (e.g., a sub-routine or sub-operations) of the operation 235 where the computing device generates the enhanced coverage model. At operation 236, the computing device determines the item domain based on the irrelevant domain. The item domain excludes the irrelevant domain. The computing device may determine the item domain by excluding the irrelevant domain from a domain of possible values for an integer type corresponding to the coverage item. The domain of possible values for the integer type is based on a number of bytes allocated to the integer type. The integer type for the coverage item is defined by the coverage item definition.

At operation 237, the computing device identifies one or more irrelevant buckets and excludes one or more irrelevant buckets from the enhanced coverage model, at 238. That is, the computing device uses domain operations with the calculated domain to identify relevant and irrelevant buckets. For instances where a bucket is generated for each value, the computing device excludes the irrelevant domain from the domain of the coverage item type and calculates a bucket for each resulting relevant value. For multi-valued buckets, the computing device determines the intersection of the domain of each bucket with the relevant domain of the coverage item. If the result is empty, the bucket is irrelevant and is excluded from the coverage model. If a bucket contains at least one value, it is relevant and thus included in the coverage model.

It shall be appreciated that while the description of the method 200 is addressed above with respect to a single coverage item, the method 200 may be repeated for each coverage item definition for a functional coverage analysis of a given IC design. In an example, three coverage items may be defined for a functional coverage analysis of an IC design. In a first iteration of the method 200, the computing device may generate an enhanced functional coverage model based on a first coverage item definition defining an irrelevant domain for a first coverage item using an arbitrary expression that satisfies analyzability conditions. In a second iteration of the method 200, the computing device may mark a second coverage item as ungradable based on a second coverage item definition defining an irrelevant domain for the second coverage item using an arbitrary expression that does not satisfy analyzability conditions. In a third iteration of the method 200, the computing device may determine an irrelevant domain for a third coverage item based on an explicit domain expression included in a third coverage item definition corresponding to the third coverage item.

Figure 4:
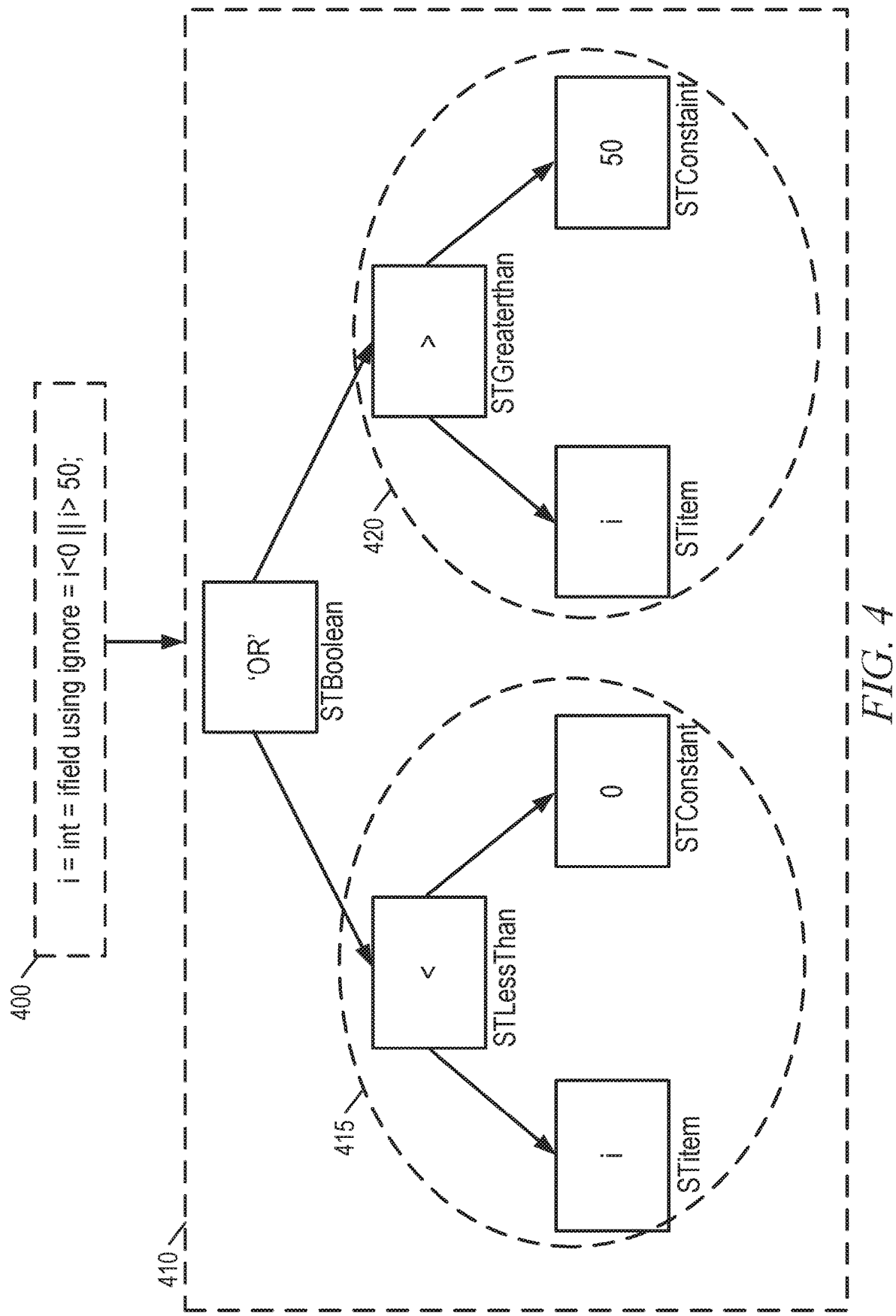
FIG. 4 is a conceptual diagram that illustrates an operation of calculating an irrelevant domain based on an arbitrary expression, according to some embodiments.

With reference to FIG. 4, an item coverage definition 400 is shown. The item coverage definition 400 comprises an arbitrary expression to define an irrelevant domain for a coverage item i ("ignore=i<0||i>50"). The arbitrary expression includes logic and arithmetic operators to define the irrelevant domain.

The item coverage definition 400 is parsed (e.g., by a parsing engine) to generate a syntax tree (ST) 410 and the ST 410 is analyzed to determine the irrelevant domain for the coverage item defined by coverage item definition 400. Assuming basic properties of the ST 410 are defined in a base class, STNode, and specific properties are defined in inherited classes, the analysis can be implemented using virtual methods of such classes. For example, the following pseudo code represents an implementation of this analysis:

```
class STNode {
parent: STNode;
children[ ]: STNode;
virtual bool IsAnalizable( );
virtual Domain Analize(Domain typeDomain);
}
class STBooleanOr extends STNode {
bool IsAnalizable( ) {
    return children[0].IsAnalizable( ) and children[1].IsAnalizable( );
}
Domain Analize(Domain typeDomain) {
    return
children[0].Analize(typeDomain).unite(children[1].Analize(typeDomain));
}
}
class STLessThan extends STNode {
bool IsAnalizable( ) {
    return children[0].IsAnalizable( ) and children[1].IsAnalizable( );
}
Domain Analize(Domain typeDomain) {
    if children[0].isItem( ) {
        return new Domain(-inf, children[1].value( )-1).intersect(typeDomain);
    } else . . .
    . . .
}
}
class STGreaterThan extends STNode {
bool IsAnalizable( ) {
    return children[0].IsAnalizable( ) and children[1].IsAnalizable( );
}
Domain Analize(Domain typeDomain) {
    if children[0].isItem( ) {
        return new Domain(children[1].value( )+1, intf).intersect(typeDomain);
    } else . . .
    . . .
}
}
class STItem extends STNode {
bool IsAnalizable( ) {return true}
}
Domain Analize(Domain typeDomain) {
    // not called
}
bool isItem( ) {return true}
}
class STConstant extends STNode {
value: int;
bool IsAnalizable( ) {return true}
}
Domain Analize(Domain typeDomain) {
    //not called
}
int value( ) {return value}
}
```

In the above pseudocode, a call to IsAnalizable( ) on the root node of ST 410, STBooleanOr, leads to a recursive traversal of the ST 410. Since all the nodes are analyzable, result of calling IsAnalizable( ) is true.

A call to Analize( ) recursively traverses the ST 410. Subtrees return their domain to higher-level nodes, which are treated according to operation semantics. Left subtree 415 of the ST 410 is true when i belongs to [ . . . -1]. And given that an integer's domain is $[-2^{31} \ldots 2^{31}-1]$ the left subtree signifies a domain of $[-2^{31} \ldots -1]$. Right subtree 420 of the ST 410 evaluates to true when i belongs to [51 . . . ], signifying a domain of $[51 \ldots 2^{31}-1]$. The 'or' evaluates to true once either the left or right subtrees is true (meaning as union operation), resulting in a determination that the irrelevant domain for i is $[-2^{31} \ldots -1, 51 \ldots 2^{31}-1]$.

Figure 5:
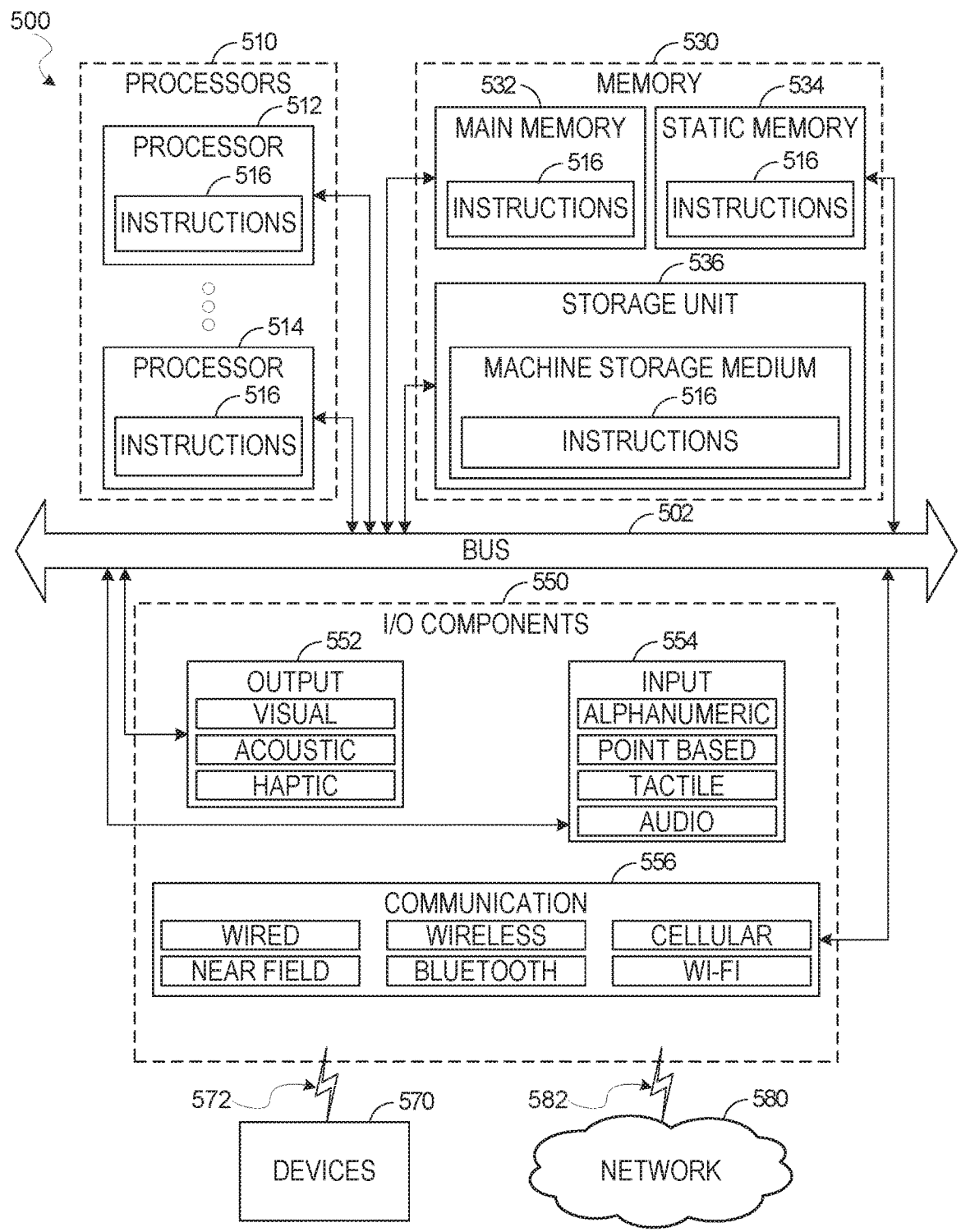
FIG. 5 is a diagrammatic representation of a machine in the example form of a computer system within which a set of instructions for causing the machine to perform any one or more of the methodologies discussed herein may be stored and executed.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute methods 200 and 200. Additionally, or alternatively, the instructions 516 may implement the design flow 100 of FIG. 1. The instructions 516 transform the general, non-programmed machine 500 into a particular machine 500 programmed to carry out the described and illustrated functions in the manner described here. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a CPU, a reduced instruction set computing (RISC) processor, a complex instruction set computing (CISC) processor, a GPU, a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors 510 that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core processor), multiple processors with a single core, multiple processors with multiple cores, or any combination thereof.

The memory 530 may include a main memory 532, a static memory 534, and a storage unit 536, all accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 550 may include communication components 556 operable to couple the machine 500 to a network 580 or devices 570 via a coupling 582 and a coupling 572, respectively. For example, the communication components 556 may include a network interface component or another suitable device to interface with the network 580. In further examples, the communication components 556 may include wired communication components, wireless communication components, cellular communication components, and other communication components to provide communication via other modalities (e.g., near field, Bluetooth, and Wi-Fi). The devices 570 may be another machine or any of a wide variety of peripheral devices (e.g., a peripheral device coupled via a universal serial bus (USB)).

Executable Instructions and Machine Storage Medium

The various memories (e.g., 530, 532, 534, and/or the memory of the processor(s) 510) and/or the storage unit 536 may store one or more sets of instructions and data structures (e.g., software) embodying or utilized by any one or more of the methodologies or functions described herein. These instructions, when executed by the processor(s) 510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 556) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   one or more processors of a machine; and
   a computer-storage medium storing instructions, which when executed by the one or more processors, configure the machine to perform operations comprising:
   determining a coverage item definition comprises an arbitrary expression that defines an irrelevant domain for a coverage item in a functional coverage analysis of an integrated circuit device design;
   based on determining the item definition comprises the arbitrary expression, verifying the arbitrary expression satisfies one or more analyzability conditions;
   based on verifying the arbitrary expression satisfies the one or more analyzability conditions, calculating the irrelevant domain for the coverage item based on the arbitrary expression;
   generating an enhanced functional coverage model that excludes the irrelevant domain for the coverage item; and
   performing the functional coverage analysis on the integrated circuit device design using the enhanced functional coverage model.

2. The system of claim 1, wherein the verifying the arbitrary expression satisfies analyzability conditions:

verifying the arbitrary expression includes only variables, constants, logic operators or arithmetic operators.

3. The system of claim 1, wherein the verifying the arbitrary expression satisfies analyzability conditions comprises:
confirming the arbitrary expression evaluates to an identical result for identical item values.

4. The system of claim 1, wherein generating the enhanced functional coverage model comprises:
determining an item domain for the coverage item based on the coverage item definition, the item domain excluding the irrelevant domain; and
identifying one or more irrelevant buckets based on the irrelevant domain; and
excluding the one or more irrelevant buckets from the enhanced functional coverage model.

5. The system of claim 1, wherein the calculating of the irrelevant domain for the coverage item comprises:
generating a syntax tree based on the arbitrary expression; and
performing a domain analysis on the syntax tree to determine the irrelevant domain of the coverage item.

6. The system of claim 1, wherein:
the coverage item definition is a first coverage item definition defining a first coverage item;
the functional coverage model comprises a second coverage item definition for a second coverage item,
the operations further comprise determining the second coverage item definition includes an expression that defines an irrelevant domain for the second coverage item using domain syntax;
the enhanced coverage model excludes the irrelevant domain for the second coverage item based on determining that the second coverage item definition includes the expression that defines the irrelevant domain for the second coverage item using domain syntax.

7. The system of claim 1, wherein:
the coverage item definition is a first coverage item definition defining a first coverage item;
the arbitrary expression is a first arbitrary expression;
the functional coverage model comprises a second coverage item definition for a second coverage item,
the operations further comprise
determining the second item definition comprises a second arbitrary expression that defines an irrelevant domain for the second coverage item,
determining the second arbitrary expression fails to satisfy one or more analyzability conditions; and
based on determining the second arbitrary expression fails to satisfy the one or more analyzability conditions, performing one of:
treating the coverage item as being ungradable in the enhanced functional coverage model; or
evaluating the second arbitrary expression multiple times to heuristically identify irrelevant buckets.

8. The system of claim 1, wherein the arbitrary expression includes one or more logic operators or one or more arithmetic operators.

9. A method comprising:
accessing a coverage item definition corresponding to a coverage item in a functional coverage analysis of an integrated circuit device design;
determining the coverage item definition comprises an arbitrary expression that defines an irrelevant domain for the coverage item;
based on verifying the arbitrary expression satisfies one or more analyzability conditions, calculating the irrelevant domain for the coverage item based on the arbitrary expression;
generating an enhanced functional coverage model that excludes the irrelevant domain for the coverage item; and
performing the functional coverage analysis on the integrated circuit device design using the enhanced functional coverage model.

10. The method of claim 9, further comprising:
verifying the arbitrary expression satisfies the one or more analyzability conditions.

11. The method of claim 9, wherein the verifying the arbitrary expression satisfies analyzability conditions comprises:
confirming the arbitrary expression evaluates to an identical result for identical item values.

12. The method of claim 9, wherein generating the enhanced functional coverage model comprises:
determining an item domain for the coverage item based on the coverage item definition, the item domain excluding the irrelevant domain; and
excluding one or more irrelevant buckets from the enhanced functional coverage model based on the irrelevant domain.

13. The method of claim 9, wherein the calculating of the irrelevant domain for the coverage item comprises:
generating a syntax tree based on the arbitrary expression; and
performing a domain analysis on the syntax tree to determine the irrelevant domain of the coverage item.

14. The method of claim 9, wherein:
the coverage item definition is a first coverage item definition defining a first coverage item;
the functional coverage model comprises a second coverage item definition for a second coverage item,
the method further comprises determining the second coverage item definition includes an expression that defines an irrelevant domain for the second coverage item using domain syntax;
the enhanced coverage model excludes the irrelevant domain for the second coverage item based on determining that the second coverage item definition includes the expression that defines the irrelevant domain for the second coverage item using domain syntax.

15. The method of claim 9, wherein:
the coverage item definition is a first coverage item definition defining a first coverage item;
the arbitrary expression is a first arbitrary expression;
the functional coverage model comprises a second coverage item definition for a second coverage item,
the method further comprises:
determining the second item definition comprises a second arbitrary expression that defines an irrelevant domain for the second coverage item,
determining the second arbitrary expression fails to satisfy one or more analyzability conditions; and
based on determining the second arbitrary expression fails to satisfy one or more analyzability conditions, performing one of:
treating the coverage item as being ungradable in the enhanced functional coverage model; or
evaluating the second arbitrary expression multiple times to heuristically identify irrelevant buckets.

16. The method of claim 9, wherein the arbitrary expression includes one or more logic operators or one or more arithmetic operators.

17. A non-transitory computer-storage medium storing instructions, which when executed by one or more processors of a machine, cause the machine to perform operations comprising:

accessing a coverage item definition corresponding to a coverage item in a functional coverage analysis of an integrated circuit device design;

determining the coverage item definition comprises an arbitrary expression that defines an irrelevant domain for the coverage item;

based on determining the item definition comprises the arbitrary expression, verifying the arbitrary expression satisfies one or more analyzability conditions;

based on verifying the arbitrary expression satisfies the one or more analyzability conditions, calculating the irrelevant domain for the coverage item based on the arbitrary expression;

generating an enhanced functional coverage model that excludes the irrelevant domain for the coverage item; and performing the functional coverage analysis on the integrated circuit device design using the enhanced functional coverage model.

18. The non-transitory computer-storage medium of claim 17, wherein calculating of the irrelevant domain for the coverage item comprises:

generating a syntax tree based on the arbitrary expression; and performing a domain analysis on the syntax tree to determine the irrelevant domain of the coverage item.

19. The non-transitory computer-storage medium of claim 17, wherein the arbitrary expression includes one or more logic operators or one or more arithmetic operators.

20. The non-transitory computer-storage medium of claim 17, wherein the verifying the arbitrary expression satisfies analyzability conditions comprises:

confirming the arbitrary expression evaluates to an identical result for identical item values.

* * * * *